United States Patent [19]

Gaffard et al.

[11] Patent Number: 5,288,167
[45] Date of Patent: Feb. 22, 1994

[54] LASER BEAM GUIDANCE DEVICE FOR CIVIL ENGINEERING/EARTHMOVING PLANT

[75] Inventors: Jean-Paul Gaffard, Fontainebleau; Geneviéve Chabassier, Fresnes, both of France

[73] Assignee: Laserdot

[21] Appl. No.: 968,445

[22] Filed: Oct. 29, 1992

[30] Foreign Application Priority Data

Nov. 6, 1991 [FR] France .................... 91 13693

[51] Int. Cl.$^5$ .................................. E01C 19/00
[52] U.S. Cl. ...................... 404/84.05; 404/84.5; 356/4
[58] Field of Search ............... 404/84.05, 84.5, 84.2; 356/4, 152

[56] References Cited

U.S. PATENT DOCUMENTS

| | | | |
|---|---|---|---|
| 3,914,064 | 10/1975 | Gurries | 404/84 |
| 3,953,145 | 4/1976 | Teach | 404/84 |
| 4,185,712 | 1/1980 | Bulger | 180/131 |
| 4,200,787 | 4/1980 | Carson | 250/227 |
| 4,912,643 | 3/1990 | Beirxe | 364/449 |
| 4,936,678 | 6/1990 | Gordon et al. | 356/375 |
| 4,978,246 | 12/1990 | Quenzi et al. | 404/84 |

FOREIGN PATENT DOCUMENTS

| | | |
|---|---|---|
| 0443026 | 8/1991 | European Pat. Off. . |
| 1147964 | 5/1963 | Fed. Rep. of Germany ..... 404/84.5 |
| 3827619 | 2/1990 | Fed. Rep. of Germany . |
| 2078995 | 11/1971 | France . |

OTHER PUBLICATIONS

Patent Abstract of Japn, vol. 11, No. 91, Oct. 29, 1986.

Primary Examiner—Mark Rosenbaum
Assistant Examiner—John M. Husar
Attorney, Agent, or Firm—Remy J. VanOphem

[57] ABSTRACT

A device for guiding a civil engineering/earthmoving machine using laser beams having a laser emitter and two laser receivers each mounted on a displacement unit mobile with two degrees of freedom. Two receiver position sensors are associated with each unit to measure its position with reference to two degrees of freedom and to generate signals representative of this position. A machine position sensor measures the position of the machine with reference to a fifth degree of freedom and generates a signal representing this position. A computer responsive to these signals stores the geometrical features of the surface over which the machine is guided and controls each receiver in two dimensions to maintain it centered on the beam from the laser emitter. The computer also generates in real time command instructions applied to actuators controlling the machine, on the basis of these geometrical features.

8 Claims, 5 Drawing Sheets

LASER BEAM GUIDANCE DEVICE FOR CIVIL ENGINEERING/EARTHMOVING PLANT

BACKGROUND OF THE INVENTION

1. Field of the Invention

The present invention concerns a laser beam guidance device for a civil engineering/earthmoving plant controlled by means of actuators and required to move along a predetermined path having a three-dimensional surface, the device being of the kind using a laser emitter and two laser receivers.

2. Description of the Prior Art

A preferred but by no means exclusive application of the present invention is to guiding machines for surfacing roads or paths in three dimensions. These are wide machines (approximately 10 m wide) which at present are guided by means of wires stretched along either side of the road or path to be surfaced. These surfacing machines are well known and include, for example, the GP-2500 machine manufactured and marketed by the company Gomaco Corporation of Ida Grove, Iowa.

Using a guidance device of this kind is in practice somewhat complicated and time-consuming given the large number of operations required to lay the wires. Also, if the road or path is curved, the curve is approximated by a series of straight line segments along which the guide wires must be stretched, which increases the number of operations required to install and adjust the guidance device, especially when the machine reaches junctions between the segments.

One objective of the present invention is, therefore, to simplify the guidance device without requiring significant modification to the machine.

British Patent No. 2,228,507 discloses a surfacing machine embodying a tool adapted to be positioned heightwise relative to the machine and to the surface worked on, two laser receivers disposed on actuators mounted above the tool so that they move the laser receivers in a vertical direction, a device for measuring the distance travelled and logic responsive to signals from the receivers and the distance measuring device adapted to control the actuators. The laser receivers cooperate with a laser emitter mounted a predetermined height above the surface to be worked on and adapted to scan a laser beam in a reference plane.

The logic stores the required surface profile in memory. In response to logic signals transmitted by the laser receivers and the distance measuring device, the logic controls the actuators to maintain the receivers in the reference plane and positions the tool to shape the surface according to the stored profile.

Note that this machine can only position the tool relative to the reference plane along an axis perpendicular to the latter. It is, therefore, unable to guide the machine along a path or road with a three-dimensional surface. In particular, it is unable to guide the machine around a curve.

What is more, because the laser beam scans a large surface area and impinges on the receivers at two points only therein, much laser light energy is dissipated into the atmosphere. As the beam is not collimated at the receiver a high energy input is required to obtain a long range.

The present invention is directed to a guidance device implementing some of the teachings of British Patent No. 2,228,507 but adapted to guide a machine for shaping a three-dimensional surface, in particular for surfacing roads or paths, where the latter are curved, while being more efficient than the prior art machine described above.

SUMMARY OF THE INVENTION

The present invention is a device for guiding a civil engineering/earthmoving machine controlled by actuators having to move along a predetermined path with a three dimensional surface using at least one laser emitter and first and second laser receivers each mounted on a translation or rotation displacement unit which is movable with two degrees of freedom.

The device includes a set of two receiver position sensors associated with each displacement unit, the sensors being adapted to measure the position of the unit with reference to two degrees of freedom and to generate signals representative of the position.

The device also includes a first machine position sensor adapted to measure the position of the machine with reference to a fifth degree of freedom and to generate a signal representative of this position, and a computer responsive to the signals. The computer is adapted to store the geometrical features of the path and to control each receiver in two dimensions to maintain it centered on the beam from the laser emitter or a predetermined one of the laser emitters and to generate in real time command instructions applied to the actuators controlling the machine according to the geometrical features in order to move it along the path.

By virtue of these features the present invention achieves the above-mentioned objectives. In particular, it is able to guide the machine along a curve. As the laser beam is collimated at the receivers, the efficiency in terms of dissipated light energy is much better than with the device described in the prior art document mentioned above. Thus with the same output power a device in accordance with the present invention is able to operate in atmospheres that are much more polluted, in particular by dust, than the prior art device described above.

One skilled in the art will realize that machines previously guided by means of wires can easily be adapted at low cost to accommodate the various means of a guidance device in accordance with the invention.

According to another feature of the invention advantageously implemented in a preferred embodiment thereof, the first machine position sensor employs a third laser receiver cooperating with a second laser emitter and mounted on a third translation or rotation displacement unit which is movable with two degrees of freedom. The device further has a set of two receiver position sensors associated with the third displacement unit and adapted to measure the position thereof with reference to two degrees of freedom and to generate a signal representative of the position. The computer is further adapted to process signals from the position sensors of the third unit and to control the third receiver in two dimensions to maintain it centered on the beam from the second laser emitter.

By virtue of these arrangements, using two laser emitters the position of the machine is known with reference to five degrees of freedom and the measurement according to a supplementary degree of freedom provided by the third set of two position sensors associated with the third displacement unit provides redundant data advantageously enabling any residual errors to be minimized.

In this preferred embodiment a machine position sensor is provided which advantageously indicates the position of the machine along the path it is working on (constituting a sixth degree of freedom).

According to another feature of the invention advantageously implemented in a preferred embodiment thereof with a view to measuring any warping of the machine it further includes another "warping measurement" laser receiver associated with another laser emitter. The laser receiver is mounted on a translation or rotation displacement unit which is movable with two degrees of freedom. A set of two receiver position sensors associated with the displacement unit carrying the warping measurement laser receiver and adapted to measure the position of the latter with reference to two degrees of freedom and to generate signals representative of the position are also provided. The computer is further adapted to process signals from the receiver position sensors of the unit carrying the warping measurement laser receiver and to control the latter in two dimensions to maintain it centered on the laser beam from the other laser emitter.

By virtue of this arrangement two additional items of data are provided so that any warping of the machine can be taken into account. As mentioned above, the type of machine to be guided by a device in accordance with the present invention is usually fairly wide (around 10 m or more). Despite the rugged construction of such machines, they are subject to warping and this is taken into account by a guidance device in accordance with the present invention which enables the computer to make the necessary corrections to cancel out or at least minimize any errors due to such warping.

The features and advantages of the invention will emerge from the following description given with reference to the appended drawings.

DETAILED DESCRIPTION OF THE PREFERRED EMBODIMENT

In the preferred embodiment shown in the figures the guidance device is used on a GP-2500 machine 10 for surfacing roads or paths of the type manufactured and marketed by the company Gomaco Corporation of Ida Grove, Iowa.

A machine of this kind is normally guided by a system which includes wires stretched along either side of the road or track to be surfaced.

The construction of a machine of this kind is well known to one skilled in the art and does not form part of the present invention, which is not limited to use on this machine. The construction of the machine will, therefore, not be described in more detail here.

Figure 1:
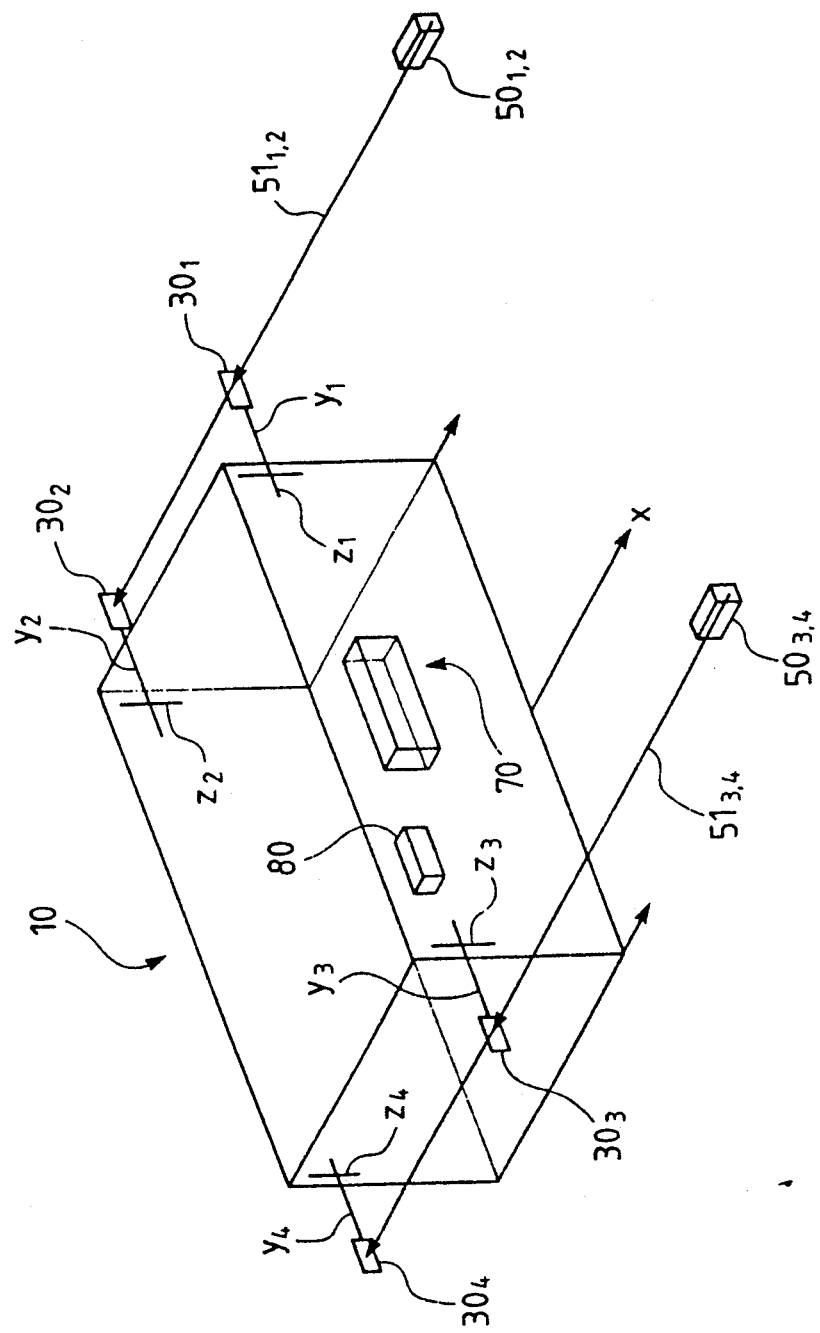
FIG. 1 is a diagram showing a preferred embodiment of the invention.
Figure 5:
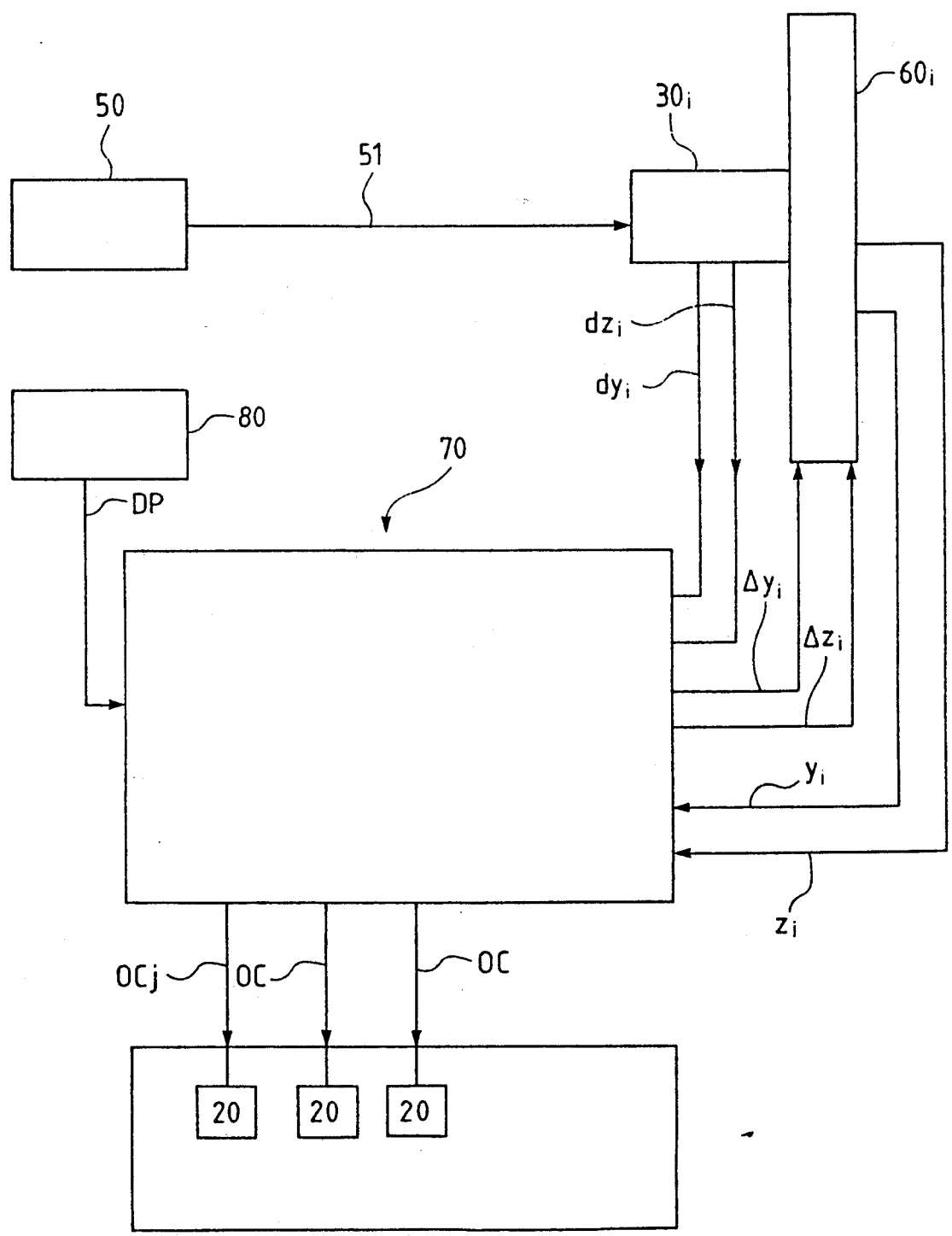
FIG. 5 is a simplified logic diagram of the device shown in FIG. 1.

FIGS. 1 and 5 show the machine 10 and FIG. 5 shows actuators 20 controlling the machine (for example, they control the steering mechanism, the speed control mechanisms, etc.). The structure of these actuators is well known to one skilled in the art. To understand the present invention it is sufficient to note that these actuators may be controlled by means of low-voltage logic signals.

In accordance with the invention, the machine 10 includes at least two laser receivers $30_i$ mounted on a displacement unit movable with two degrees of freedom. In this embodiment the displacement unit is mobile in translation along $y_i$ and $z_i$ axes perpendicular to an $x_i$ axis parallel to the direction of movement of the machine when the latter moves forward in a straight line. The $y_i$ axes are horizontal and the $z_i$ axes are vertical.

In the selected embodiment shown in the figure, four laser receivers $30_1$, $30_2$, $30_3$, and $30_4$ are disposed on translation displacement units respectively mobile along pairs of axes $(y_1, z_1)$, $(y_2, z_2)$, $(y_3, z_3)$ and $(y_4, z_4)$.

FIG. 1 shows that the first two laser receivers $30_1$ and $30_2$ are aligned on the beam $51_{1,2}$ from a first laser emitter $50_{1,2}$ and that the two receivers $30_3$ and $30_4$ are aligned on the beam $51_{3,4}$ from a second laser emitter $50_{3,4}$.

The laser emitters are disposed on either side of the path or road to be surfaced by the machine 10 and are adapted to emit parallel beams 51, the distance between which is such that they face the laser receivers in question.

The machine 10 further includes a device 80 for measuring the distance travelled by the machine along the path it shapes, from an arbitrarily selected origin point. By convention, this measurement is referred to herein as the "measurement with reference to the sixth degree of freedom". The distance measuring device 80 supplies a voltage proportional to the distance covered by the machine from the point of origin. In this example it has a wheel towed behind the machine and an associated incremental angular encoder. As the wheel turns, the encoder generates an electrical signal in the form of a series of pulses. The encoder may be any commercially available device.

Subject to calibration beforehand, counting these pulses provides a way of computing the distance covered by the machine from the point of origin.

The machine is also provided with a computer 70.

Figure 2:
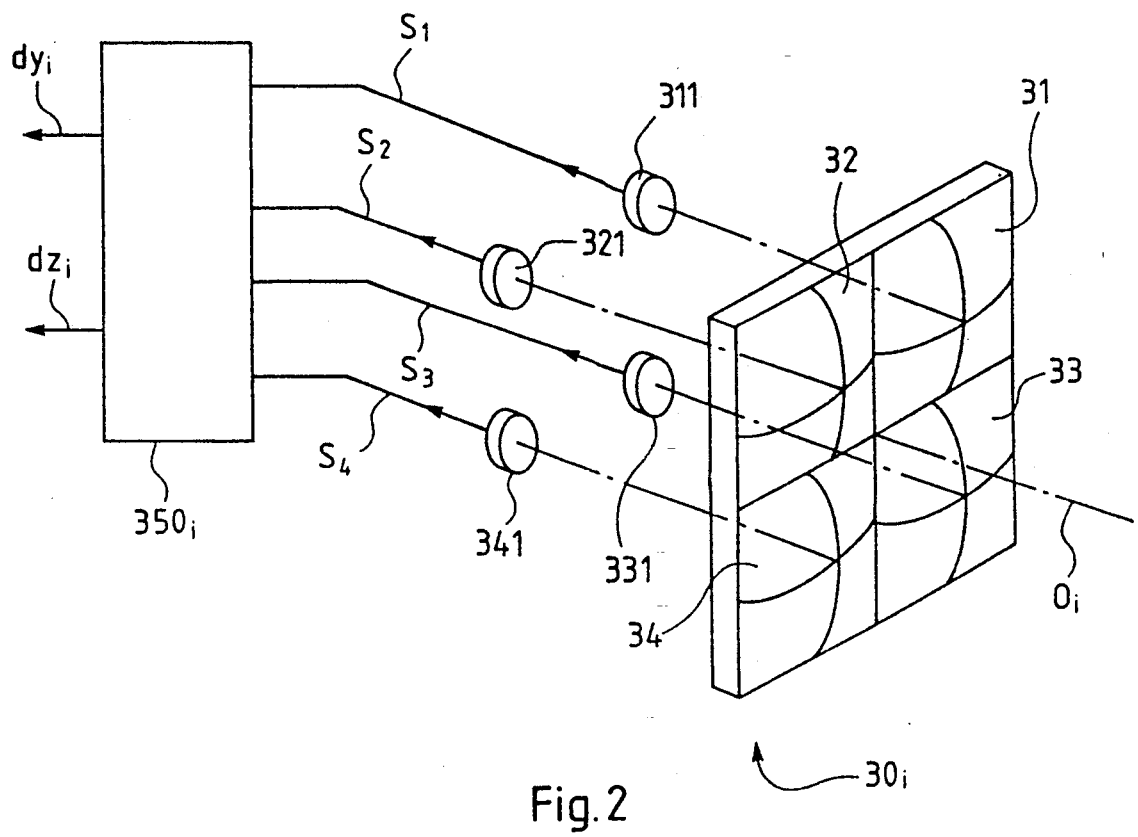
FIG. 2 is a diagram showing the arrangement of the main parts or a receiver used in the preferred embodiment of FIG. 1.

FIG. 2 is a diagram showing the main parts of the laser receivers used in this embodiment of the present invention.

Each receiver $30_i$ embodies four lenses 31 through 34 focusing the laser beam on four receivers (photodetectors) 311, 321, 331 and 341, each at the focus of a respective lens 31 through 34. The photodetectors employed are OS D 60-0 silicon photodiodes manufactured and marketed by the company Centronic Limited of Surrey, Great Britain. The lenses employed are 01 LPX 111 plano-convex lenses $25 \times 25$ mm² with a focal length of 50 mm marketed by the company Melles Griot of Irvine, Calif. Their usable light receiving diameter is approximately 50 mm. The point at which the lenses 31 through 34 intersect defines the axis $O_i$ of the receiver $30_i$ in question. The axis $O_i$ is parallel to the x axis. The photodetectors 311, 321, 331 and 341 each emit a respective output signal $S_1$ through $S_4$. These signals are proportional to the energy received and are directed to an electronic decoder $350_i$ associated with each receiver $30_i$. The signal level at the output of the detectors (signals S1–S4) is approximately 15 nA if the axis $O_i$ of the receiver $30_i$ is centered on the laser beam.

The electronic decoder $350_i$ includes circuits for amplifying and then demodulating the signals $S_1$ through $S_4$. It also includes an analog circuit forming the sum and difference of pairs of the signals $S_1$ and $S_4$ and dividing by the sum of the signals so that misalignments of the axis $O_i$ of the receiver $30_i$ relative to the laser beam are independent of the received energy. The decoder $350_i$, therefore, emits signals $dy_i$ and $dz_i$ respectively representing offsets on the horizontal axis $y_i$ and the vertical axis $z_i$ given by the equations:

$$dy_i = \frac{(S_1 + S_4) - (S_2 + S_3)}{(S_1 + S_2 + S_3 + S_4)}$$

$$dz_i = \frac{(S_1 + S_2) - (S_4 + S_3)}{(S_1 + S_2 + S_3 + S_4)}$$

The structure of the decoder $350_i$ will not be described in more detail here. It is obvious to one skilled in the art who knows how to carry out the above-mentioned operations on low-level signals like the signals $S_1$ through $S_4$, in particular by using appropriately biased operational amplifiers and RC circuits.

Figure 2A:
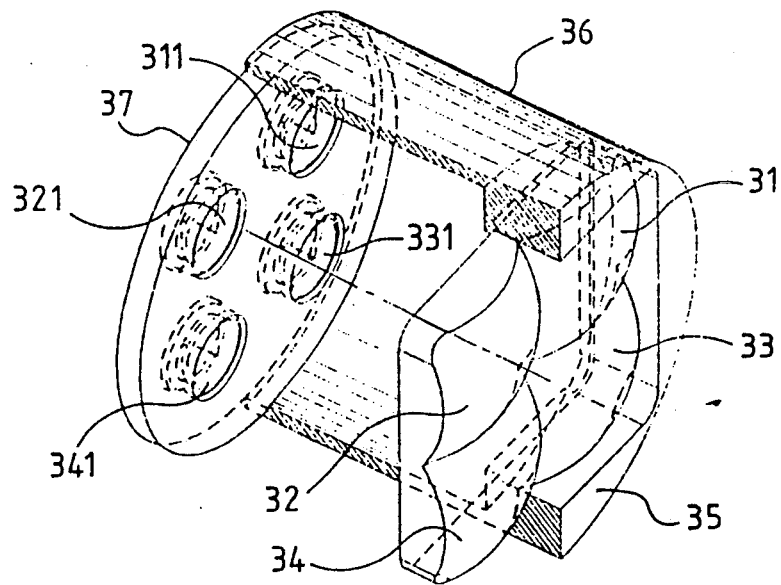
FIG. 2a is a simplified and partially cut away perspective view of one embodiment of the receiver 30 shown in FIG. 2.

FIG. 2a is a simplified and partially cut away perspective view of one embodiment of the receiver $30_i$ shown in FIG. 2. This figure shows the photodetectors 311, 321, 331 and 341 and the lenses 31 through 34 associated with each photodetector. The four lenses 31 through 34 are arranged in a square. This assembly is retained by a ring 35 at the end of a cylindrical body 36. The photodetectors are mounted on a frame 37 at the opposite end of the body 36. The assembly is sealed and forms a dark chamber favoring correct operation of the photodetectors. In this example the cylindrical body 36 is made from aluminum.

The decoder $350_i$ is housed with the other equipment, and in particular the computer, in a casing (not shown) in the machine 10.

The translation displacement units used in this preferred embodiment and on which the laser receivers $30_i$ are mounted will now be described with reference to FIG. 3. These units are movable along the $y_i$ and $z_i$ axes.

Figure 3:
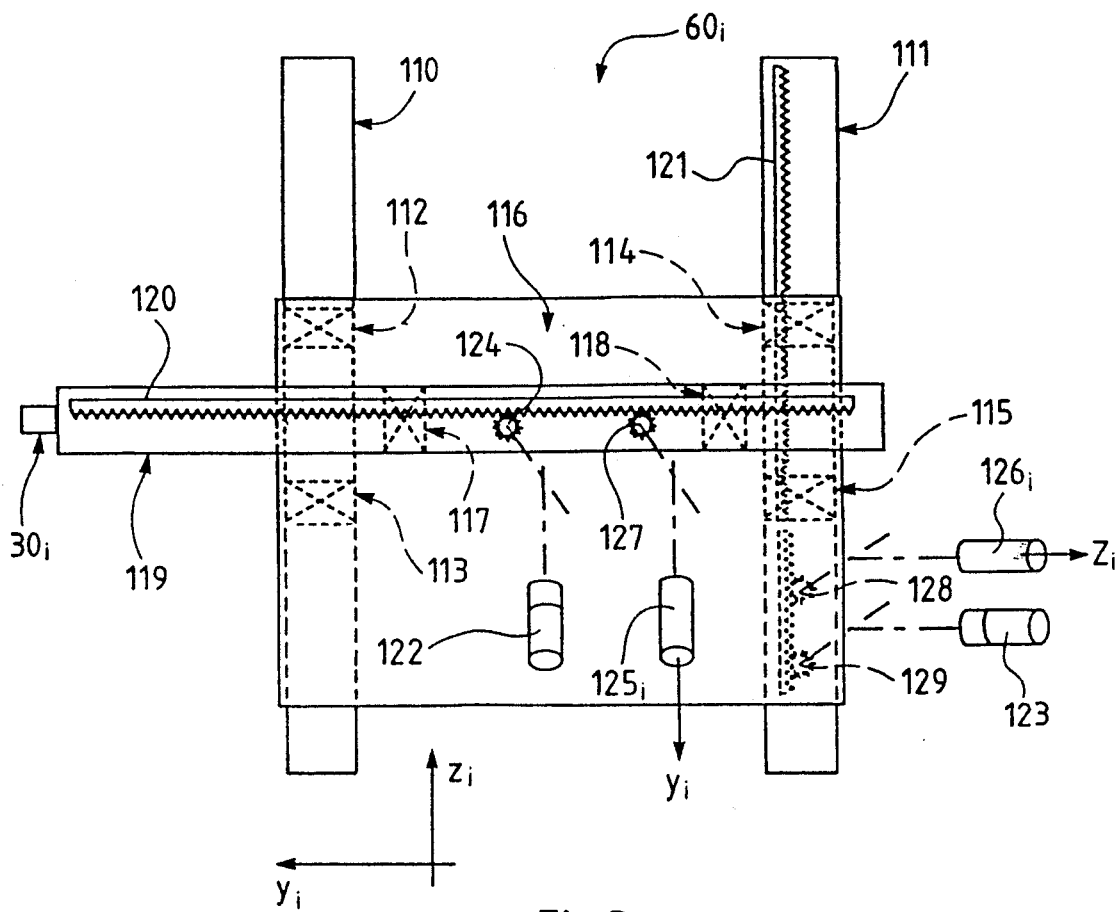
FIG. 3 is a diagram showing a translation displacement unit associated with each receiver in the preferred embodiment of the invention.

In this embodiment each displacement unit $60_i$ includes two vertical slideways 110 and 111 fixed to the structure of the machine (not shown in FIG. 3). Each vertical slideway 110 and 111 carries two mobile carriages 112 through 115 adapted to slide along the respective slideway. The specific arrangement of the slideways and carriages is obvious to one skilled in the art and will not be described in more detail here.

Two further carriages 117 and 118 are mounted on the side of a plate 116 opposite that on which the carriages 112 through 115 are mounted. Like the carriages 112 through 115, the carriages 117 and 118 are fixed relative to the plate. The carriages 117 and 118 enable sliding movement of a horizontal slideway 119. In this embodiment the carriages 117 and 118 and the slideway 119 are of the same type as the carriages 112 through 115 and the slideways 110 and 111. The receiver $30_i$ is at one end of the slideway 119, the left-hand end as seen in FIG. 3.

Two racks 120 (horizontal) and 121 (vertical) are fixed to the horizontal slideway 119 and the right-hand vertical slideway 111, respectively.

The plate 116 also carries two motor-gearbox units, each, in this example, embodying a MAXON F 21-40937 motor and a MAXON 29-38-803-0018.0-000 gearbox manufactured by the company Interelectric S.A. Sachseln/OW Confederation Helvetique 6072. FIG. 3 shows the motor-gearbox units 122 and 123. They are fixed to the plate 116. The motor-gearbox unit 122 drives a pinion 124 (the transmission is symbolically shown by chain-dotted lines) and meshes with the rack 120 on the slideway 119. Likewise, the motor-gearbox unit 123 drives a pinion 129 meshing with the rack 121 on the slideway 111. Accordingly, when the motors 122 and 123 are energized they move the plate 116 along the slideways 110 and 111 (which moves the receiver $30_i$ along the $z_i$ axis) and the slideway 119 relative to the plate 116 (which moves the receiver $30_i$ along the $y_i$ axis).

Digital encoders $125_i$ and $126_i$ (in this embodiment 34-16 type encoders manufactured by the company Interelectric S.A.) are provided to measure the displacement of the plate 116 along the slideways 110 and 111 and of the slideway 119 relative to the plate 116. These encoders $125_i$ ($y_i$ axis) and $126_i$ ($z_i$ axis) are driven by respective pinions 127 and 128, respectively meshing with the horizontal rack 120 and the vertical rack 121.

The digital encoders $125_i$ and $126_i$ emit signals in the form of a series of pulses enabling the position $y_i$ and $z_i$ of each receiver $30_i$ to be determined.

The motor-gearbox units 122 and 123 are supplied with a series of positive or negative voltage pulses from the output of an interface circuit board connected between the motors of the motor-gearbox units 122 and 123 and the computer 70 (see below).

In this embodiment the travel of movement in translation of the receiver $30_i$ is 1 m along the $y_i$ axis and 50 cm along the $z_i$ axis.

Figure 4:
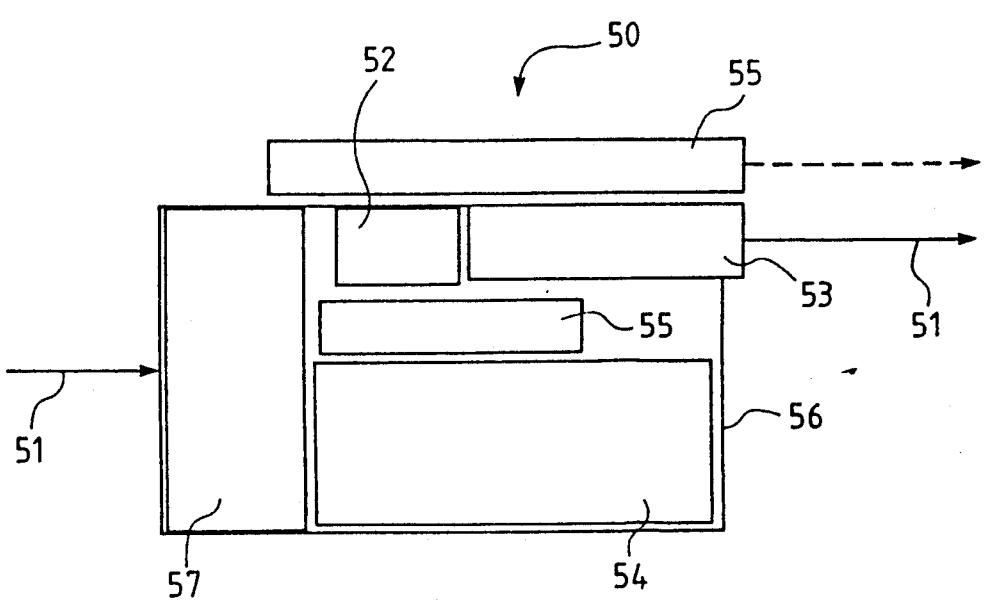
FIG. 4 is a diagram showing the main parts of the laser emitters used in the preferred embodiment of the invention.

FIG. 4 is a diagram showing the main parts of the laser emitters 50 used in the embodiment of the present invention currently being described.

The emitters include a laser diode 52 (in this example of the 06DLL207 type manufactured by Melles Griot emitting a beam at around 0.78 μm with a maximum power rating of 3 mW). The beams are collimated by an afocal collimator device 53 so that the beam has a diameter of 20 mm at a distance of 200 m.

In this embodiment the afocal collimator device 53 is a two-lens device with an enlargement ratio of approximately 3.

The emitter also embodies an electronic device 54 which has a two-fold function:
  power supply to the diode 52; and
  high-frequency modulation of the beam intensity to facilitate detection of the beam (the electronic circuitry $350_i$ of the receiver includes a demodulator).

The emitter system in this example is temperature stabilized at 25° C. by a Peltier effect device 55 and can operate with ambient temperatures approaching 40° C.

To facilitate the pointing of one emitter at the other (see below) an auxiliary beam is produced by an HeNe visible light auxiliary laser 55 or a low-power diode. This auxiliary beam has the additional advantage of making obvious to users the presence of the invisible infrared beam emitted by the combination of the diode 52 and the collimator 53.

The system is protected by a cap 56.

The emitters are designed to be mounted on tripods (not shown) similar to those used by surveyors. Each emitter is further provided with an alignment receiver 57 analogous to the receiver system described with reference to FIG. 3, the signals dy and dz being fed to voltmeters. A mechanism is provided for adjusting the position of the emitter on the tripod so that the installer can adjust the position of the emitter 50 in question using the voltmeters showing the dy and dz offsets so that the latter is centered on the beam 51 sent by the other emitter.

The block diagram of the guidance system as a whole (FIG. 5) will now be described.

This figure shows one of the emitters 50 and one of the receivers $30_i$ mounted on its displacement unit $60_i$. To simplify the diagram the other emitter and the other receivers are not shown.

In accordance with the invention the device includes a multifunction computer 70. The computer 70 is an IBM PC or compatible microcomputer fitted with various interface boards for the connections to the various peripheral devices (receivers, position encoders, motor, distance measuring device, actuators).

The conventional interface boards used in this example are manufactured and marketed by I.C.S. Industrial Computer Source of San Diego, Calif. under the following product codes:

- AI 016-BF board for acquisition and analog to digital conversion of distance measuring device output signals;
- DIO 216 board for acquisition of displacement unit encoder ($125_i$ and $126_i$) and fifth wheel output signals;
- AO B12 board for controlling the motors of the motor-gearbox units 122 and 123 of the displacement units $60_i$; and
- AO B6 board for sending the voltages controlling the machine actuators.

The computer 70 receives the following input data:
signals $dy_i$ and $dz_i$ from each receiver $30_i$; the position $y_i$ and $z_i$ of each receiver $30_i$ as measured by the position detectors (digital encoders $125_i$ and $126_i$) associated with the displacement units $60_i$; and a signal DP representing the distance travelled by the machine, supplied by the distance measuring device 80.

The output signals of the computer 70 are mainly of two kinds:
control signals $Dy_i$ and $Dz_i$ for aligning the $O_i$ axis of each receiver $30_i$ to the axis of the beam 51 received by that receiver, and command instructions (signals OC) supplied to the actuators 20 controlling the machine.

The computer also supplies further data necessary to the operation of the machine 10.

The operation of the device will now be described.

Data concerning the path of the machine 10, in the form of an ASCII file, is loaded into the random access memory of the computer 70 from a magnetic storage medium. This data is produced by the surveyors' department responsible for determining or defining the surface of the road or path to be shaped (the surface is digitized).

The computer continuously receives data enabling it to determine the position $y_i$ and $z_i$ of each receiver $30_i$.

This data is received via the DIO 216 board (ICS) from the position sensors (digital encoders $125_i$ and $126_i$) associated with each displacement unit $60_i$ in the form of signals constituting a series of pulses that the computer counts up or down. Likewise, as explained above, the computer receives data $dy_i$ and $dz_i$ relating to the offset of the $O_i$ axis of each receiver $30_i$ from the axis of the laser beam 51. It produces control signals $Dy_i$ and $Dz_i$ transmitted via the interface board AO B12 (ICS) in the form of voltage signals to the motor of each motor-gearbox unit 122 and 123 of the displacement unit $60_i$ to realign the $O_i$ axis of the receiver $30_i$ in question to the beam.

This operation is carried out for each of the receivers $30_i$.

From the data $y_i$ and $z_i$ supplied by each position sensor associated with the displacement unit $60_i$, the computer knows the position of each receiver $30_i$ along the $y_i$ and $z_i$ axes. It consequently knows the position of the machine because the distance measuring device 80 sends a signal DP representing the distance travelled from an arbitrary origin.

On the basis of data relating to the path supplied by the ASCII file stored in the random access memory of the computer 70 and data relating to the position of the receivers and of the machine, the computer generates orders to be applied to the various actuators 20 controlling the machine to move the latter along the theoretical path stored in the computer memory.

Various features of the embodiment shown in FIG. 1 and their resulting advantages should be emphasized.

A single laser emitter $50_{1,2}$ is used for the receivers $30_1$ and $30_2$; likewise, the receivers $30_3$ and $30_4$ are associated with a single emitter $50_{3,4}$. The number of emitters used is, therefore, reduced (two in this example, rather than four, i.e. one per receiver).

The position sensors associated with each translation unit carrying the receivers $30_i$ deliver signals according to two degrees of freedom ($y_i$, $z_i$). The computer, therefore, has eight indications as to the position of the machine in addition to that relative to its position along the path travelled supplied by the distance measuring device 80 (i.e. nine position indications in all). There is, therefore, significant redundancy of data which is put to good use.

This redundancy is used to minimize any errors due to the sensor or to slight deflection of the laser beams. The data from the receivers $30_1$, $30_2$ and $30_3$ and from the distance measuring device 80 (data relating to seven degrees of freedom) is used to minimize the error relating to the position (requiring six degrees of freedom). The errors are minimized in the known manner by applying the mathematical method of least squares.

The data from the receiver $30_4$ may then be used for two purposes.

It should be borne in mind that these machines are particularly wide and may deform despite their stiffness. This deformation, which is in practice warping, requires measurements with reference to two further degrees of freedom if it is to be correctable by the computer: the data from the receiver $30_4$ is used for this purpose. For this reason the receiver $30_4$ may be regarded as a "warp measurement" receiver.

The measurements from the receiver $30_4$ may also be used if one or more other receivers $30_i$ are deactivated or out of action (see below). In any such situation the computer still has data from the other receivers and so can position the machine.

The machine described here can be simplified if there is a requirement to minimize the number of receivers and possibly of laser emitters.

In a second embodiment, for example, the receivers $30_3$ and $30_4$ and the emitter $50_{3,4}$ are eliminated.

Assuming this, the computer 70 obtains from the receivers $30_1$ and $30_2$ data relating to the pitch angle (measured rotation of the machine about an axis parallel to the $y_i$ axes) and the yaw angle (measured rotation about an axis parallel to the $z_i$ axes). This data is easily obtained because the beam $51_{1,2}$ is pointed at the two aligned receivers $30_1$ and $30_2$.

The computer also obtains the position of the machine along the $y_i$ and $z_i$ axes.

The fifth degree of freedom (in this example data relating to the roll angle or measured rotation about the x axis) may generally be provided by a machine position sensor adapted to measure the position of the machine 10 with reference to the fifth degree of freedom and to generate a signal representative thereof.

In the example under consideration the data relating to rolling of the machine may be provided by an inclinometer.

The distance measuring device 80 supplies the position of the machine on the path (sixth degree of freedom).

In a third embodiment the inclinometer mentioned above may be replaced by a receiver $30_3$ mounted on a displacement unit $60_3$ identical to those described above and cooperating with an emitter positioned like the emitter $50_3$ of FIG. 1 (this embodiment is similar to the embodiment shown in FIG. 1, the receiver $30_4$ having been eliminated). This arrangement enables the computer to receive seven indications as to the position of the machine and consequently to minimize residual errors. However, with this hypothesis, warping measurement data is not acted on (this data is not required for machines narrower than that considered until now).

Other combinations of machine position sensors (distance measuring device, inclinometer) and the receivers are envisaged, for example use in a fourth embodiment of only the receivers $30_1$ and $30_3$ mounted on displacement units $60_2$ and $60_3$ cooperating with two parallel laser beams and two distance measuring devices at the lateral ends of the machine: the computer then has data relating to six degrees of freedom, enabling it to calculate the position.

The embodiments using a smaller number of receivers and/or laser emitters are less costly than the embodiment described with reference to FIG. 1 and may be sufficient, given the required accuracy in some applications.

Note, further, that fitting a guidance device in accordance with the invention to a machine previously guided by wires is relatively simple. The signals $y_i$ and $z_i$ entering the computer 70 may be of the same kind as those previously supplied by the wire guidance system. Also, the computer output signals OC may be the same as those used in the prior art.

Another aspect of the present invention conferring upon it an important advantage over the wire guidance system will now be described.

Figure 6:
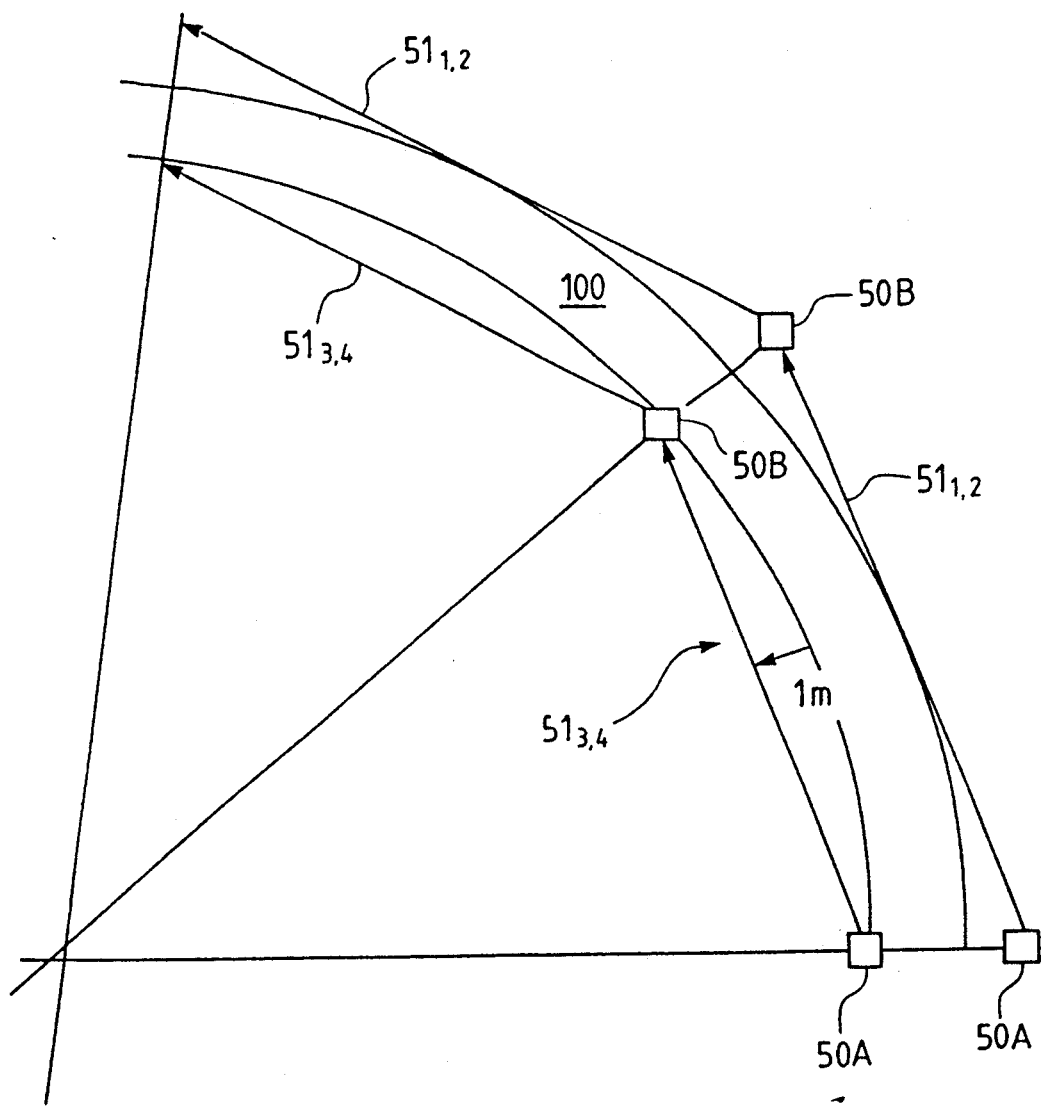
FIG. 6 is a diagram showing the use of the preferred embodiment of a guidance device in accordance with the invention.

FIG. 6 shows that in the context of the present invention and that of the prior art the curves traced by the road or path to be surfaced are approximated at the guidance device by straight line segments.

FIG. 6 shows the road 100 to be surfaced. It follows a curve of radius R. The guide beams $51_{1,2}$ and $51_{3,4}$ are shown. Note that for the road section 100 two series of guide beams are needed.

The beams 51 are emitted by two series of emitters 50A and 50B.

The emitters 50A and 50B and more generally all the emitters needed are installed on conventional surveying tripods provided at the upper end with an orientable platform whose rotation axis is graduated and on which the emitters 50 are placed. The tripods are in practice installed by a surveyor using an alignment grid to accurately determine the position of the platform axes.

As explained with reference to FIG. 3, each emitter 50 includes an alignment receiver 57 whose structure is similar to that of the receivers $30_i$. This receiver is used to align the beams 51. After the beam has been roughly pointed at the next emitter by the surveyor (for example at one of the emitters 50B), fine adjustment can be carried out using the alignment receiver 57 included in that emitter, centering being obtained when the signals dy and dz read off the voltmeters by a technician have a value near or equal to zero.

The curves of the road under construction are thus approximated successively, allowing for the fact that the machine is stored to select a linear path until the obstacle represented by the emitter has been removed or shifted.

Of course, the present invention is not limited to the embodiments described or the embodiment shown but to the contrary encompasses any alternate embodiments obvious to one skilled in the art.

We claim:

1. A device for guiding an earthmoving machine which is controlled with at least one actuation means such that said earthmoving machine moves along a predetermined path having a three dimensional surface, said device comprising:

at least one laser emitter for generating a beam, first and second laser receivers for receiving said beam, and displacement means having at least two degrees of freedom for mounting said first and second laser receivers to said earthmoving machine;

first means for sensing the position of said first and second laser receivers with respect to said at least two degrees of freedom, said first sensing means generating first and second output signals corresponding to the positions of said first and second laser receivers;

second means associated with said earthmoving machine for sensing the position of said earthmoving machine with respect to a fifth degree of freedom, said second sensing means generating a third output signal corresponding to the position of said earthmoving machine with respect to said fifth degree of freedom;

means in communication with said at least one actuation means and said first and second sensing means for storing data corresponding to said three dimensional surface of said predetermined path;

means in communication with said first sensing means for controlling said displacement means in said at least two degrees of freedom so as to position said first and second laser receivers to receive said beam generated by said at least one laser emitter; and means in communication with said data storage means and said controlling means for actuating said at least one actuation means so as to substantially maintain said earthmoving machine on said predetermined path.

2. A device according to claim 1 wherein said second sensing means comprises a second laser emitter and a third laser receiver for receiving a second beam generated by said second laser emitter, said third laser receiver being mobile with two degrees of freedom, said device further comprising third means for sensing the position of said third laser receiver with respect to said two degrees of freedom, said third sensing means generating a fourth output signal corresponding to the position of said third laser receiver, said device further comprising means for processing said fourth output signal from said third sensing means and means for controlling said third laser receiver in said two degrees of freedom such that said third laser receiver receives a second beam from said second laser emitter.

3. A device according to claim 1 further comprising:
   means for detecting warping of said earthmoving machine mounted on said earthmoving machine so as to be mobile with two degrees of freedom;
   a second laser emitter associated with said warp detecting means; and
   third means associated with said warp detecting means for sensing the position of said warp detecting means with respect to said two degrees of freedom, said third sensing means generating a fourth output signal corresponding to the position of said warp detecting means, said device further comprising means for processing said fourth output signal from said third sensing means and means for controlling said warp detecting means in said two degrees of freedom such that said warp detecting means receives a second beam from said second laser emitter.

4. A device according to claim 3 wherein said first and second laser receivers are aligned on said beam from said at least one laser emitter, said device further comprising a third laser receiver aligned with said warp detecting means on said second beam from said second laser emitter.

5. A device according to claim 1 wherein said second sensing means measures the position of said earthmoving machine with respect to said predetermined path.

6. A device according to claim 1 wherein said device further comprises a second emitter and said at least one laser emitter comprises an alignment receiver to enable said second emitter to be aligned with said at least one laser emitter.

7. A device according to claim 1 wherein said at least one laser emitter further comprises a visible second laser beam to facilitate aiming said beam.

8. A device for guiding an earthmoving machine which is controlled with at least one actuator such that said earthmoving machine moves along a predetermined path having a three dimensional surface, said device comprising:
   first and second laser emitters for generating first and second laser beams;
   at least four displacement means mounted on said earthmoving machine, each of said at least four displacement means having a corresponding two degrees of freedom;
   a laser receiver mounted to each one of said at least four displacement means so as to receive one of said first and second laser beams, two of said laser receivers receiving said first laser beam, two of said laser receivers receiving said second laser beam;
   means in communication with said at least four displacement means for sensing the position of each of said at least four displacement means with respect to said corresponding two degrees of freedom, said sensing means generating output signals corresponding to the position of each of said at least four displacement means;
   second means mounted to said earthmoving machine for sensing the position of said earthmoving machine with respect to said predetermined path, said second sensing means generating a second output signal corresponding to the position of said earthmoving machine with respect to said predetermined path; and
   computer means in communication with said at least one actuator, said sensing means, said second sensing means, and said laser receivers for storing data corresponding to said three dimensional surface of said predetermined path, for controlling said at least four displacement means so as to position said laser receivers to receive said first and second laser beams generated by said first and second laser emitters, and for controlling said at least one actuator so as to substantially maintain said earthmoving machine on said predetermined path.

* * * * *

UNITED STATES PATENT AND TRADEMARK OFFICE
CERTIFICATE OF CORRECTION

PATENT NO. : 5,288,167
DATED : February 22, 1994
INVENTOR(S) : Jean-Paul Gafford and Genevieve Chabassier It is certified that error appears in the above-indentified patent and that said Letters Patent is hereby corrected as shown below:

Column 10, line 5, delete "SOB" and insert ---50B---.

Signed and Sealed this

Twelfth Day of July, 1994

Attest:

BRUCE LEHMAN

Attesting Officer

Commissioner of Patents and Trademarks